(12) United States Patent
Pratt et al.

(10) Patent No.: US 9,795,075 B2
(45) Date of Patent: Oct. 24, 2017

(54) PLANTING GRID DEVICE

(71) Applicants: Karl Pratt, Surrey (CA); Jennifer Pratt, Surrey (CA)

(72) Inventors: Karl Pratt, Surrey (CA); Jennifer Pratt, Surrey (CA)

(*) Notice: Subject to any disclaimer, the term of this patent is extended or adjusted under 35 U.S.C. 154(b) by 132 days.

(21) Appl. No.: 14/282,869

(22) Filed: May 20, 2014

(65) Prior Publication Data

US 2014/0338578 A1 Nov. 20, 2014

Related U.S. Application Data

(60) Provisional application No. 61/825,282, filed on May 20, 2013.

(51) Int. Cl.
*A01C 7/02* (2006.01)
*A01C 5/02* (2006.01)

(52) U.S. Cl.
CPC ....... *A01C 7/02* (2013.01); *A01C 5/02* (2013.01)

(58) Field of Classification Search
CPC ...... A01C 7/02; A01C 7/00; A01C 5/02; A01C 5/00; A01C 7/002
See application file for complete search history.

(56) References Cited

U.S. PATENT DOCUMENTS

| 4,159,597 A * | 7/1979 | Olsen .............. A01G 9/108 111/100 |
| D371,493 S | 7/1996 | Beaulieu |
| 5,813,471 A | 9/1998 | Ramsey |
| 5,936,200 A * | 8/1999 | Park .............. H01R 4/26 174/59 |
| 6,024,034 A | 2/2000 | Howell |
| 6,142,241 A | 11/2000 | Finley |
| 6,341,690 B1 * | 1/2002 | Swiatosz .......... A63B 55/408 206/315.3 |
| 6,662,736 B1 | 12/2003 | Lowe et al. |
| 8,056,646 B2 | 11/2011 | Broadstone |

* cited by examiner

*Primary Examiner* — Christopher J Novosad
(74) *Attorney, Agent, or Firm* — Global Intellectual Property Agency, LLC; Daniel Enea

(57) ABSTRACT

The present seed spacing and planting device consists of a planar member with a plurality of sidewalls having beveled edges extending vertically therefrom, with an integral or removable grid. A plurality of evenly spaced pegs or apertures are disposed along the face of the base, aligned with said sidewalls. The present device is pressed into the ground, edges downwards, to create a plurality of depressions for planting either seeds or seedlings therein. For embodiments having pegs, the pegs automatically create the depressions because they are pressed into the soil along with the beveled edges. For embodiments having apertures, a dibble is additionally provided which is pushed through said apertures for creating the planting depressions.

8 Claims, 5 Drawing Sheets

PLANTING GRID DEVICE

CROSS REFERENCE TO RELATED APPLICATION

This application claims the benefit of U.S. Provisional Application No. 61/825,282 filed on May 20, 2013, entitled "Garden Grid." The above identified patent application is herein incorporated by reference in its entirety to provide continuity of disclosure.

BACKGROUND OF THE INVENTION

Field of the Invention

The present invention relates to devices for planting gardens. More specifically, the present invention relates to devices adapted to create a plurality of evenly spaced depressions in the soil suitable for planting either seeds or seedlings.

Gardening is a discipline that requires a high degree of precision to execute perfectly, yet it can often be exceedingly difficult to perfect the technique with the array of gardening products currently available on the market. The growth of seeds or seedlings can be affected by whether they are planted too closely together, too far apart, too deep, or too shallow. However, controlling these factors can be difficult to do when one is merely digging holes by hand with a trowel, as many gardeners do. Even if the growth of the seeds or seedlings is relatively unaffected by their placement within the soil, a haphazardly organized garden bed will not make efficient use of the space and will unnecessarily limit the number of plants that the gardener can plant at a given time. Therefore there is a strong need for a product that will allow users to efficiently plant their seeds, seedlings, or plants in organized rows to maximize the use of space, while simultaneously ensuring that each plant of a given type is planted at the correct depth to maximize its growth potential.

Current devices available in the marketplace attempt to address these problems in a variety of ways. Most planting devices designed to plant seeds or seedlings at the correct depth and space away from each other consist of a handle portion and a portion having a plurality of spaced protrusions. Users push the protrusions into the soil, which creates a plurality of spaced recesses suitable for planting seeds or seedlings therein. While these types of devices adequately plant that particular set of seeds or seedlings, it does not solve the issue of creating an overall organized garden because the user then has to guess where to create the next set of recesses. Furthermore, the depth of the recesses is not easily controllable, which may be a substantial issue for some types of plants. Other types of depth and spacing tools have generally similar configurations, but instead have a plurality of pegs or protrusions disposed on the face of a generally planar surface that is placed peg-side down into the soil. These types of devices can simultaneously create a large number of planting recesses aligned in a plurality of rows; however, they still lack the ability to efficiently and easily control the depth of the depressions. Such devices also generally have a single layout, and thus can only plant gardens with a single configuration, which can be very problematic for plants that need varying amount of space between them for ideal growth.

The present invention pertains to a novel means for ensuring that seeds or seedlings are planted at the correct depth and correctly spaced away from each other. The present invention ensures that users' gardens will be organized in an efficient and space-conscious manner, allowing the users to maximize the number of plants that they can fit within a given area. Furthermore, the grid design of the present invention allows users to quickly and easily plant multiple rows at once to guarantee that seeds or seedlings are not only spaced correctly in relation to other plants in their row, but are simultaneously spaced correctly in relation to all of the other rows. Embodiments using the dibble also allow users to customize the depth at which their seeds or seedlings are planted in a reliable manner because the dibble has a plurality of measuring lines disposed that give an optical indication to the user when a particular depth is reached.

Description of the Prior Art

Devices have been disclosed in the prior art that relate to ground aerators or seed planting devices. These include devices that have been patented and published in patent application publications. These devices generally relate to pegs attached to some type of support structure for placing holes within the ground. The following is a list of devices deemed most relevant to the present disclosure, which are herein described for the purposes of highlighting and differentiating the unique aspects of the present invention, and further highlighting the drawbacks existing in the prior art.

One such device is U.S. Pat. No. 5,813,471 to Ramsey, which discloses a lawn aerator having a plurality of posts disposed at the end of an elongated pole. The user aerates the ground by pressing the posts of the device into the ground, moving the device side-to-side slightly, and then withdrawing the posts from the ground. The device thereby creates holes in the ground for the purposes of increasing oxygen flow. The present invention instead uses a hand-held dibble to punch holes in the ground and further has a box portion that is adapted to assist in the even distribution of seeds or seedlings. Although both inventions are designed to punch holes into the ground, Ramsey comprises a plurality of posts disposed at the end of an elongated handle portion, whereas the present invention comprises a plurality of posts or apertures disposed across a planar base member.

Another such device is U.S. Pat. No. 6,024,034 to Howell, which discloses a tool for making a plurality of evenly-spaced depressions in the soil for planting seeds therein. Howell consists of a plurality of rods with a plurality of evenly spaced, threadably attached nipples disposed thereon. The user can extend the threaded nipple portions in order to push them into the dirt, creating a depression suitable for planting a seed within. Unlike Howell, the present seed spacing and planting device can create holes of adjustable size and depth via the dibble and the differently sized planting apertures through the base portion. The present invention also comes in embodiments having apertures through which a dibble is pushed to create depressions in the soil, in addition to embodiments having integral pegs.

U.S. Pat. No. 6,142,241 to Finley discloses an adjustable garden planting depth and spacing tool comprising a base having a plurality of holes through which a series of pegs can be inserted. The base can be placed against the ground, pressing the pegs into the soil and creating a plurality of spaced depressions suitable for planting seeds therein. Unlike Finley, the present invention comprises a plurality of spaced apertures of different sizes through which a dibble may be inserted in order to create the planting depressions.

Another such device is U.S. Pat. No. 6,662,736 to Lowe, which discloses a device for planting seeds having a plurality of tines, a plunger, and a seed container. When the tines are pressed into the ground, the plunger is pushed upwards into the seed container, which allows seed to fall to the distribution plate. When the device is picked up from the ground, the seeds then fall off of the distribution plate onto the ground below the plate and into the depressions created by the tines. The present invention has a similar goal in allowing for the quick and easy planting of a large number of seeds, but the present invention does not have a means for automatically distributing seeds in the holes created by its pegs or dibble. Furthermore, Lowe is designed such that the tines are arranged in a circular fashion around the perimeter of a plate, which is not ideal when users wish to create a plurality of evenly spaced straight rows. The present invention consists of either apertures or pegs that are aligned in a rectangular fashion such that they are evenly spaced in both the horizontal and vertical directions, making it extremely easy to create an organized garden that uses space efficiently.

Finally, U.S. Pat. No. 8,056,646 to Broadstone discloses a planting tool comprising an elongated rigid portion having a handle at one end and a plurality of projections at the opposing end. The user creates holes for planting garden plants by gripping the handle and then plunging the projections into the ground, creating depressions into which garden plants may be planted. Broadstone does not disclose a plurality of projections arranged in evenly spaced rows, thus it would be difficult to use the Broadstone device to create more than a single row of spaced depressions suitable for planting plants. The present invention has a plurality of spaced rows in both the horizontal and vertical directions, ensuring that an entire garden bed can quickly and easily be prepared for planting in an evenly spaced rectangular fashion.

The present invention provides a planting device that allows users to quickly and easily plant their seeds or seedlings in organized, neat rows that maximize the plants' growth potential. The present invention comprises a base portion having either a plurality of pegs supported thereon or a plurality of apertures extending therethrough and beveled sidewalls around the perimeter of the base. The base may further have removable planar portions having apertures of different sizes. The user need only take the device and place it on the garden plot, with the planting face oriented towards the soil. The pegs or apertures are aligned in an evenly spaced configuration suitable for planting either seeds or seedlings. For embodiments having pegs, the pegs automatically create the planting depressions, and for embodiments having apertures, the user uses an additional dibble tool to create the planting depressions at the desired depth. It substantially diverges in design elements from the prior art and consequently it is clear that there is a need in the art for an improvement to existing garden spacing and depth-setting planting devices. In this regard the instant invention substantially fulfills these needs.

SUMMARY OF THE INVENTION

In view of the foregoing disadvantages inherent in the known types of planting devices now present in the prior art, the present invention provides a new spacing and depth-setting planting device wherein the same can be utilized for providing convenience for the user when planting seeds or seedlings in a garden plot.

It is therefore an object of the present invention to provide a new and improved planting grid device that has all of the advantages of the prior art and none of the disadvantages.

It is another object of the present invention to provide a planting grid device that allows users to align seeds or seedlings in a plurality of evenly-spaced rows to maximize growing potential of the plants and efficiently use the garden area.

Another object of the present invention is to provide a planting grid device that allows users to vary the depth at which their seed or seedlings are planted.

Yet another object of the present invention is to provide a planting grid device that that is quick and simple to use.

Yet another object of the present invention is to provide a planting grid device that is capable of assisting in the planting of both seeds and seedlings.

Yet another object of the present invention is to provide a planting grid device that allows plant seeds or seedlings to be planted in different configurations depending upon the ideal growing conditions of the individual plants.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
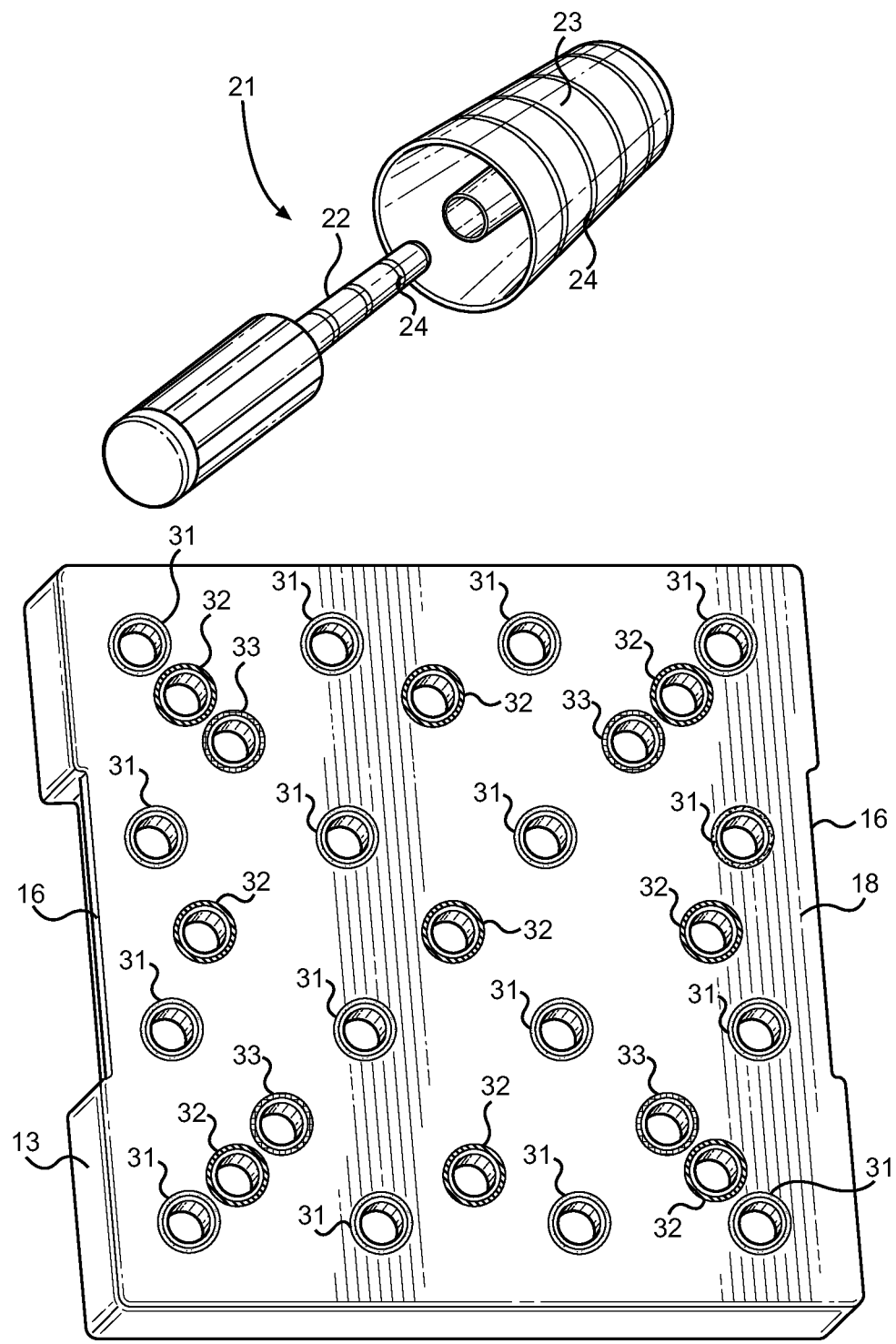
FIG. 1 shows a perspective view of an embodiment of the present invention.

Reference is made herein to the attached drawings. Like reference numerals are used throughout the drawings to depict like or similar elements of the planting grid device. For the purposes of presenting a brief and clear description of the present invention, the preferred embodiment will be discussed as used for planting seeds and seedlings in organized rows designed to maximize each plant's growth potential. The figures are intended for representative purposes only and should not be considered to be limiting in any respect.

The present invention is directed towards making a plurality of planting depressions in a garden plot in order to plant seeds or seedlings in an organized fashion. The present planting grid device generally consists of a base portion having sidewalls with beveled edges extending from its perimeter and a plurality of evenly spaced planting means disposed along the base portion. In some embodiments the planting means may comprise apertures through which a dibble hand tool can be inserted and in other embodiments the planting means may comprise pegs that directly push into the soil and thereby create depressions suitable for planting. The base portion may also be removable so that many different types and configurations of planting means can be used with the same device. Lastly, handles may be disposed at some point on the present invention in order to make it easier to users to press the present invention into the soil.

Referring now to FIG. 1, there is shown a perspective view of an embodiment of the present invention. The present invention comprises a planar member 18 having first face, a second face, and a plurality of apertures therethrough, a plurality of sidewalls 13 extending from the perimeter of said first face, and a dibble 21. The present invention further comprises handles 16 disposed on said planar member 18. The base plate 18 may be composed of any rigid material capable of resisting the force of someone pressing the device into the ground. The planar member 18 is depicted as rectangular in shape, but not particular shape is claimed by this disclosure. The beveled edges decrease the resistance to the device being pressed into the soil, thus making it easier to use the present invention.

In use, an individual places the first face of the planar member 18 against the ground, pushes the sidewalls 13 in the ground to hold the present planting grid in place, and then places the dibble 21 through the apertures 31, 32, 33 disposed across the planar member 18 to create a series of planting depressions in the soil. The apertures 31, 32, 33 are preferably arranged in one or more symmetrical configurations on the planar member 18 so that individuals may create rows of aligned planting depressions. In the depicted embodiment, the planar member has three sets of apertures 31, 32, 33 arranged in three different symmetrical configurations. One set of apertures are arranged in a four-by-four configuration 31, a second set of apertures are arranged in a three-by-three configuration, and a third set of apertures are arranged in a two-by-two configuration 33. Each corresponding set of apertures 31, 32, 33 is preferably color-coded, or has some other differentiating indicia thereon, in order to be able to easily distinguish the different sets of symmetrically arranged apertures 31, 32, 33 from each other. However, the disclosure is not limited to apertures 31, 32, 33 solely in this arrangement of three sets of apertures and no claim is made as to the specific number or arrangement of the sets of apertures 31, 32, 33. The present disclosure is intended to cover all configurations wherein the apertures 31, 32, 33 are evenly spaced and aligned in a set or series of sets to form uniform rows. Because multiple sets of aligned apertures are provided on the same planar member 18, the user can use the single planar member 18 to plant seeds or seedlings in a variety of different configurations. For example, certain plants require more space, thus they should be planted using the two by two set of aligned apertures and other types of plants require less space between each other, therefore they should be planted using the four by four set of aligned apertures.

The sidewalls 13 are designed to be pushed into the ground, creating a furrow marking the perimeter of the present planting grid. This furrow makes it easier to align the present planting grid device for a subsequent use because an adjacent grid can be aligned with the furrow created by the prior use of the present invention. The present invention is designed such that when the sidewalls 13 are pressed fully into the ground, the planar member 18 rests flush against the surface of the ground.

The dibble 21 comprises a first end 22 and a second end with a handle disposed thereon. The first end 22 may have either a uniform diameter throughout its length or may be tapered. The first end 22 preferably has a rounded termination in order to create ideally-shaped planting depressions. The dibble 21 further comprises a removable cover 23 having a larger diameter than that of the first end 22. The removable cover 23 fits onto the first end 22 and secures thereto. The removable cover 23 provides an interchangeable means for selectively increasing the diameter of the planting end of the dibble 21. The apertures 31, 32, 33 disposed on the planar member 18 preferably have a diameter sized to accept either the first end 22 or the removable cover 23. The first end 22 is generally adapted to plant seeds and the removable cover 23 is generally adapted to plant seedlings because it has a larger diameter, which creates a larger hole, and seedlings need a larger hole since they are farther along in development than seeds.

The dibble 21 further comprises a plurality of depth markers 24 disposed around the surface of the first end 22 and the removable cover 23. The depth markers 24 consist of pre-measured lines representing to the user the particular depth to which the dibble 21 is inserted into the ground, and therefore the particular depth of the resulting planting depression. Certain plants grow better when planted at a particular depth, so the depth markers 24 assist the user in creating uniform planting depressions that are catered to the particular seed or seedling being planted.

Figure 2:
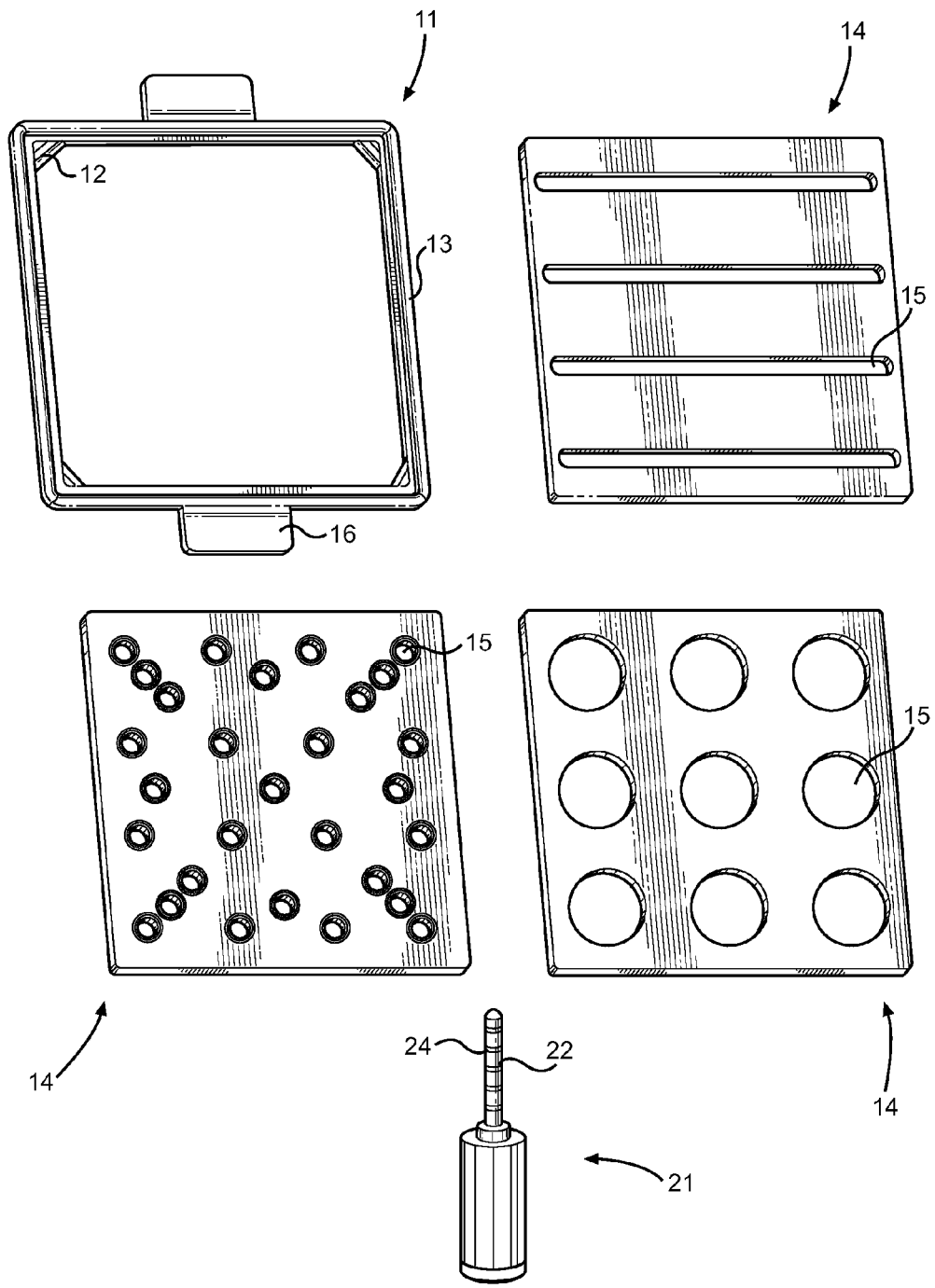
FIG. 2 shows a perspective view of an alternative embodiment of the present invention having removable and interchangeable planting grids.

Referring now to FIG. 2, there is shown a perspective view of an alternative embodiment of the present invention having removable and interchangeable planting grids. This embodiment of the present invention consists of a frame 11 with a means for securely supporting the removable plates 14 on the frame 11. The frame 11 may be composed of any material that is rigid enough to resist the stresses placed on the device from being pushed into the soil by a user. The frame 11 is depicted as rectangular, but may be of any size, shape, or design and can be adapted to be used with gardens of any shape and not only rectangularly-shaped garden plots. The frame 11 has a plurality of sides defining an open interior portion and further has a plurality of sidewalls 13 having beveled edges extending from the perimeter of the frame 11 defined by the sides. The beveled edges of the sidewalls 13 allow for easier penetration into the soil than flat edges because they have a smaller cross-sectional area at the point of initial contact with the ground and therefore have less initial resistance therefrom.

The means for supporting the removable plates 14 in place generally comprises a recessed ledge 12 extending across the interior perimeter of the frame 11, which is offset from the sidewalls 13 and allows the removable plates 14 to rest thereon. The ledge 12 supports the removable plates 14 in place within the perimeter of the frame 11 and prevents the removable plate 14 from falling or being pushed through the device when the user applies downward force to the frame 11 to push the present invention into the soil. In the depicted embodiment the support means 12 comprises a recessed shelf that extends around the interior perimeter of the frame 11. However, any means for removably supporting the removable plates 14 thereon, including latches, magnets, or any other means, may be utilized.

The removable plates 14 and their associated apertures 15 allow users to create organized, uniform rows of planting depressions so that the resulting garden is also organized in uniform rows. An organized garden with uniform rows of plants has numerous advantages over haphazardly planted gardens, including being able to more easily identify weeds since they would fall outside of the organized rows of plants, maximizing the use of space in a potentially tight area, and ensuring that plants are growing under optimal conditions since certain types of plants ideally grow different distances away from other plants. A garden organized into uniform rows is also generally more aesthetically pleasing than an unplanned, haphazardly planted garden.

The removable plates 14, or the planar member 18 as discussed above, can have a variety of different types of apertures 15, including standard round holes and elongated channels, which can come in different grid formulations, such as three by three, four by four, or a wide variety of other configurations. Embodiments of the removable plates 14 having rounded holes are used to create corresponding depressions within the soil, whereas embodiments having elongated channels are used to create corresponding elongated furrows in the soil using the dibble 21. The apertures 15 can come in various types of sizes adapted to accept either the first end 22 of the dibble 21 or the removable cover 23.

In an alternative embodiment of the present invention, instead of having a first end 22 and a removable cover, the dibble 21 comprises a substantially cylindrical first end 22 having a first diameter joined to a substantially cylindrical second end having a larger, second diameter. In this embodiment of the present invention, the dibble 21 has two opposing ends having two different diameters adapted to plant seeds or seedlings, rather than one end adapted to plant seeds or seedlings and a removable cover that is securable thereover that has a larger diameter. Both of the ends of the dibble 21 are rounded. The first end 22 is generally adapted to plant seeds and the second end is generally adapted to plant seedlings because it has a larger diameter, which creates a larger hole, and seedlings need a larger hole since they are farther along in development than seeds.

The apertures 15 may preferably be color coded when there is more than one set of apertures 15 on the same planar member or removable plate 14. The color coding allows users to easily distinguish between different sets of apertures 15. Having multiple sets of aligned apertures 15 on the same planting grid is desirable because it allows a single planting grid to be used to plant multiple different types of plants. Different types of plants have different space needs and thus should be planted different distances from other plants in order to maximize their growth potential. Embodiments having multiple sets of aligned apertures 15 on the same planting grid allow a user to plant one type of plant using one set of apertures and then immediately plant a second type of plant using one of the other sets of apertures without changing plates or making any other type of alteration to the device.

The present embodiment is used in a similar fashion to the previously discussed embodiment. The user applies a downward force to the frame 11 and removable plate 14 secured thereon to push the sidewalls 13 into the soil until the first, downward face of the removable plate 14 is flush against the surface of the ground. Handles 16 may optionally be disposed along the second, upwards face in order to assist the user in pressing the present garden planting grid device into the soil and also removing it therefrom. The user then inserts the appropriate end of the dibble 21 through the set of apertures 15 of his or her choosing to form a plurality of uniform rows of depressions for planting seeds or seedlings therein. The user then removes the frame 11 with the removable plate 14 thereon and the dibble 21 from the garden, and then proceeds to plant the seeds or seedlings within the uniforms rows of aligned depressions.

Figure 3A:
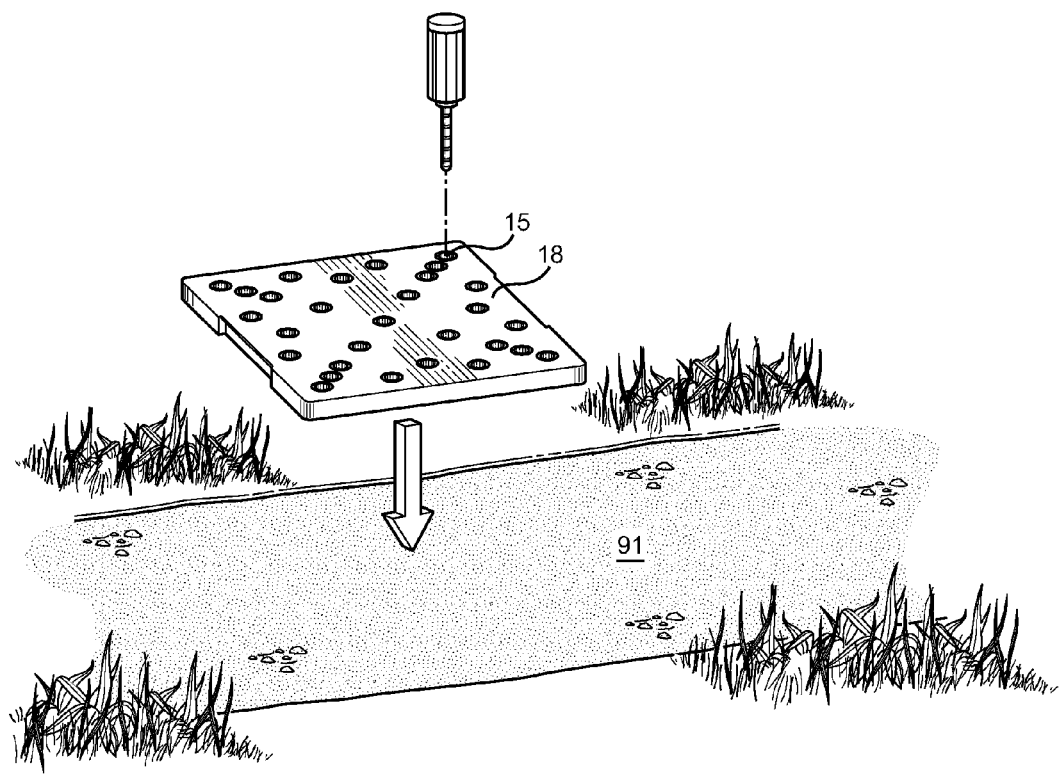
FIG. 3A shows a perspective view of an embodiment of the present invention as used to create planting depressions within a garden plot.
Figure 3B:
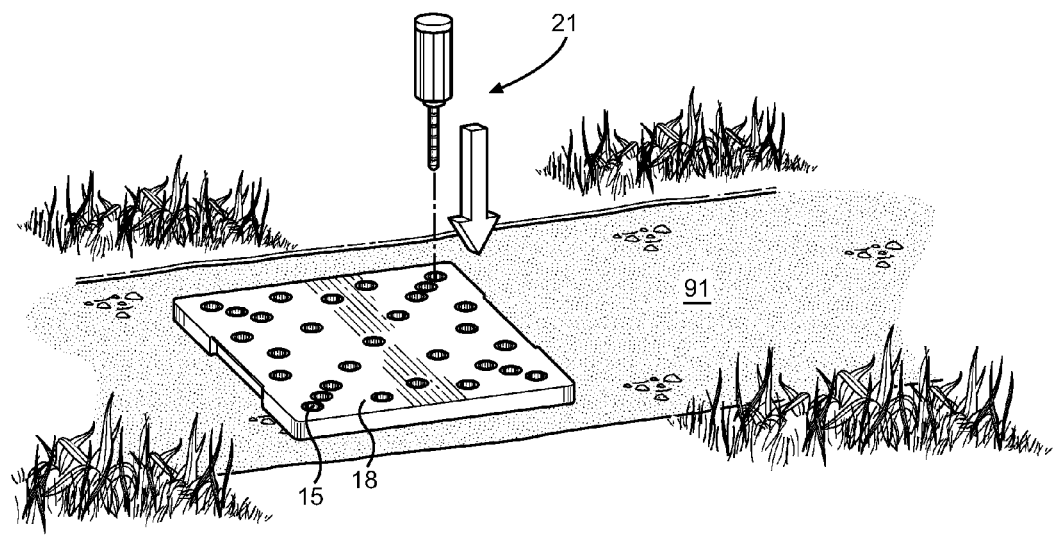
FIG. 3B shows a perspective view of an embodiment of the present invention as used to create planting depressions within a garden plot.
Figure 3C:
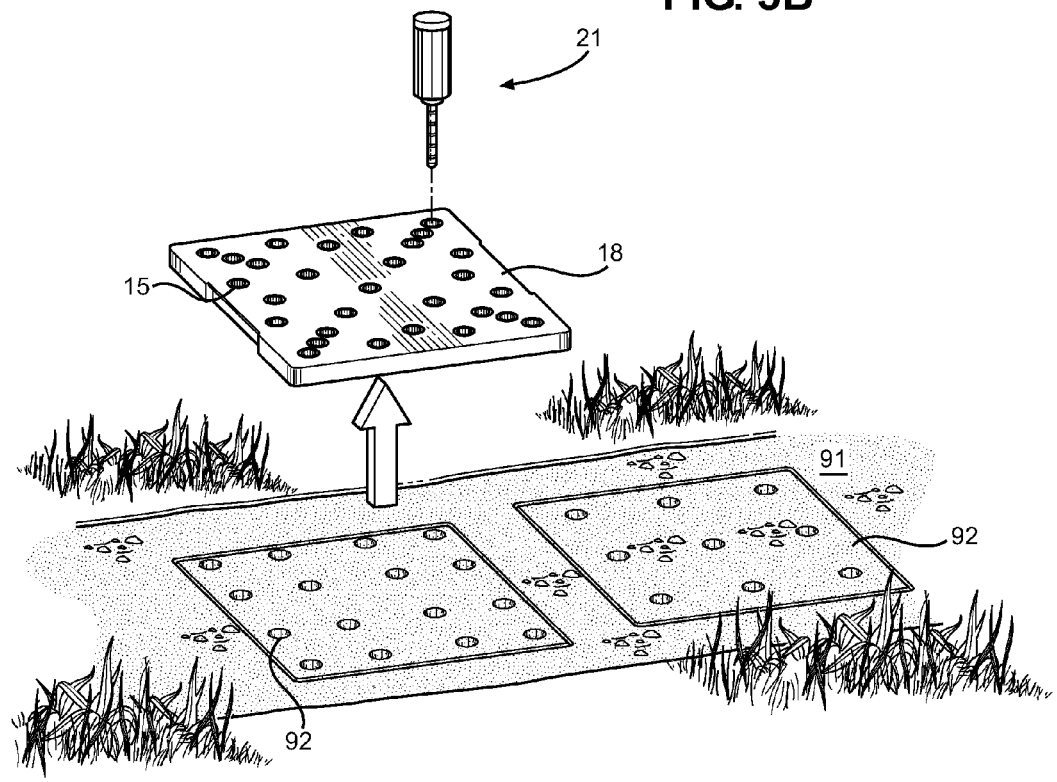
FIG. 3C shows a perspective view of an embodiment of the present invention as used to create planting depressions within a garden plot.

Referring now to FIGS. 3A, 3B, and 3C, there are shown perspective views of an embodiment of the present invention as used to create planting depressions within a garden plot. In use, the user places the planar member 18 against the ground and pushes the beveled sidewalls 13 into the soil. Alternatively, for the embodiment of the present invention depicted in FIG. 2, the user places the frame upon the ground and then chooses a removable plate having the appropriate aperture type, size, and layout and places that plate upon the recessed ledge. The user then applies downward force to the frame 11 to push the sidewalls 13 into the dirt until the removable plate is flush against the surface of the ground. Handles 16 may be disposed along the frame 11 in order to assist the user in applying the downward force and in removing the device from the soil. The user then inserts the appropriate end of the dibble 21 through the apertures 15 to create a plurality of complementary planting depressions 92 in the soil. After the dibble 21 has been inserted through the desired apertures 15, the planar member 18 or the frame and removable plate apparatus can then be removed the ground and then the seeds or seedlings can then be placed within the organized rows of depressions. If the user wishes to plant an adjacent set of seeds or seedlings, then he or she can place the appropriate sidewall 13 within one of the furrows created by a beveled sidewall 13 from the previous use of the device. This ensures that all of the rows will be properly aligned because the sets of depressions will be aligned with each other. If the user wishes, he or she can remove the previously-used removable plate 14 and replace it with a removable plate 14 having a different configuration.

Figure 4:
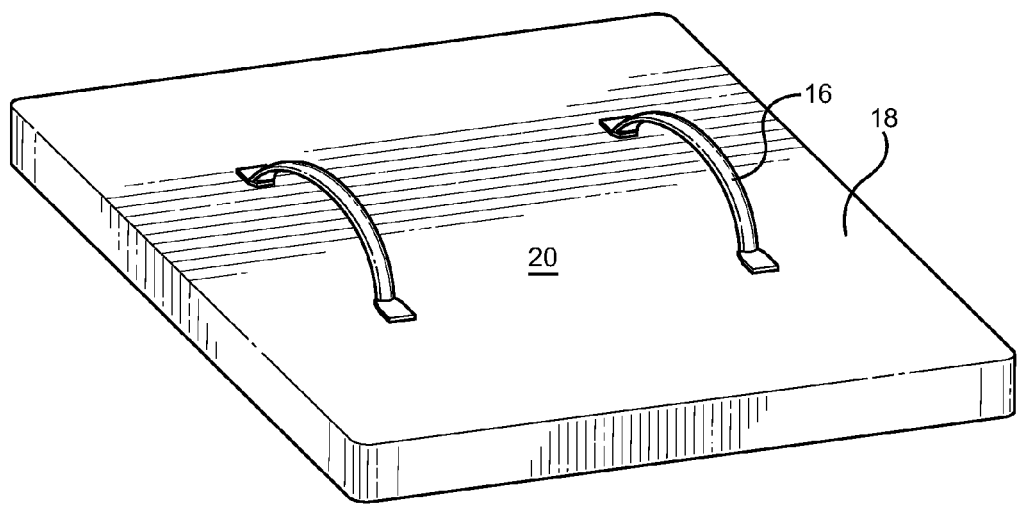
FIG. 4 shows a perspective view of the top surface of an alternative embodiment of the present invention having integral pegs.
Figure 5:
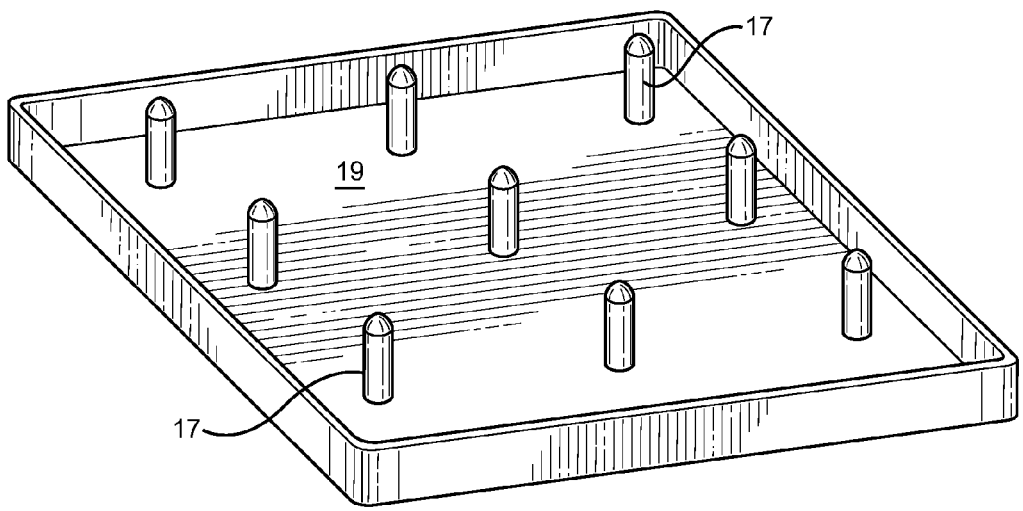
FIG. 5 shows a perspective view of the bottom surface of an alternative embodiment of the present invention having integral pegs.

Referring now to FIGS. 4 and 5, there are shown perspective views of an alternative embodiment of the present invention. Like the previous embodiment, this embodiment of the present planting grid device consists of a substantially flat planar member 18 having a first face 19 and a second face 20. A plurality of sidewalls 13 having beveled edges extend from the perimeter of the first face 19 of the base plate 18. The present embodiment further has a plurality of evenly spaced, aligned rows of pegs 17 disposed across the first face 19 of the planar member 18. Handles 16 may further be disposed along the second face of the base plate to supply a means by which users can more easily apply downward force to push the present embodiment into the soil and also remove it therefrom.

The present embodiment is used primarily in the same way as the previously discussed embodiments, however there is no need to use the dibble because of the plurality of pegs 17 that are integrally connected with the base plate 18. The user merely has to press the base plate 18 into the soils until the sidewalls 13 and the pegs 17 penetrate to the desired depth, and then remove the base plate 18. This embodiment provides a quicker way of creating planting depressions if depth is not a concern because all of the depressions are formed automatically merely be pressing down on the device.

Overall, the present planting grid device provides a new and novel means for planting seeds or seedlings in organized, efficient rows to create an aesthetically pleasing garden that also has improved growing conditions for the plants contained therein. The present invention provides a plate that can be pressed against the surface of the ground that has either apertures through which a dibble tool can be inserted to create the desired depressions or pegs that automatically and simultaneously create the depressions. Use of the dibble tool requires that the depressions be created one at a time, but the depth markers on the dibble allow the user to make each depression a certain depth of his or her choosing. Some embodiments of the invention further permit the plate portion to be removable so that different plates with different configurations can alternatively be used. Other embodiments have multiple sets of aligned apertures, which allows one plate to be used to plant different sets of seeds or seedlings.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A planting grid device comprising:
   a planar member having a plurality of apertures therethrough;
   the plurality of apertures including:
      a first set of apertures arranged a first grid;
      a second set of apertures arranged in a second grid;
      each of the first grid and the second grid including a plurality of symmetrical, evenly spaced rows;
   wherein a number of apertures in the first set of apertures is unequal to a number of apertures in the second set of apertures;
   wherein the first set of apertures and the second set of apertures are color-coded;
   a dibble configured to be inserted through the plurality of apertures; and
   a depth marker disposed on the dibble.

2. The planting grid device of claim 1, the plurality of apertures further comprising:
   a third set of apertures arranged in a third grid;
   the third grid including a plurality of symmetrical, evenly spaced rows;
   wherein a number of apertures in the third set of apertures is unequal to a number of apertures in both the second set of apertures and the third set of apertures.

3. The planting grid device of claim 2, wherein the first grid is four-by-four, the second grid is three-by-three, and the third grid is two-by-two.

4. The planting grid device of claim 1 further comprising a plurality of sidewalls extending perpendicularly from the planar member.

5. A planting grid device comprising:
   a planar member comprising a plurality of apertures therethrough;
   the plurality of apertures including:
      a first set of apertures arranged in a first grid, the first grid being an n by n grid;
      a second set of apertures arranged in a second grid, the second grid being an (n−1) by (n−1) grid;
      wherein n is an integer greater than 2;
      wherein each of the first grid and the second grid includes a plurality of symmetrical, evenly spaced rows;
   the first set of apertures denoted by a first color;
   the second set of apertures denoted by a second color; and
   wherein the first color and the second color are different colors;
   a dibble configured to be inserted through the plurality of apertures; and
   a depth marker disposed on the dibble.

6. The planting grid device of claim 5, wherein:
   the plurality of apertures further includes a third set of apertures arranged in a third grid, the third grid being an (n−2) by (n−2) grid;
   the third grid includes a plurality of symmetrical, evenly spaced rows;
   the third set of apertures denoted by a third color;
   the third color is a different color from each of the first color and the second color.

7. The planting grid device of claim 5, further comprising a dibble configured to be inserted through the plurality of apertures.

8. The planting grid device of claim 7, further comprising depth markers disposed on the dibble.

* * * * *